Figure 3:
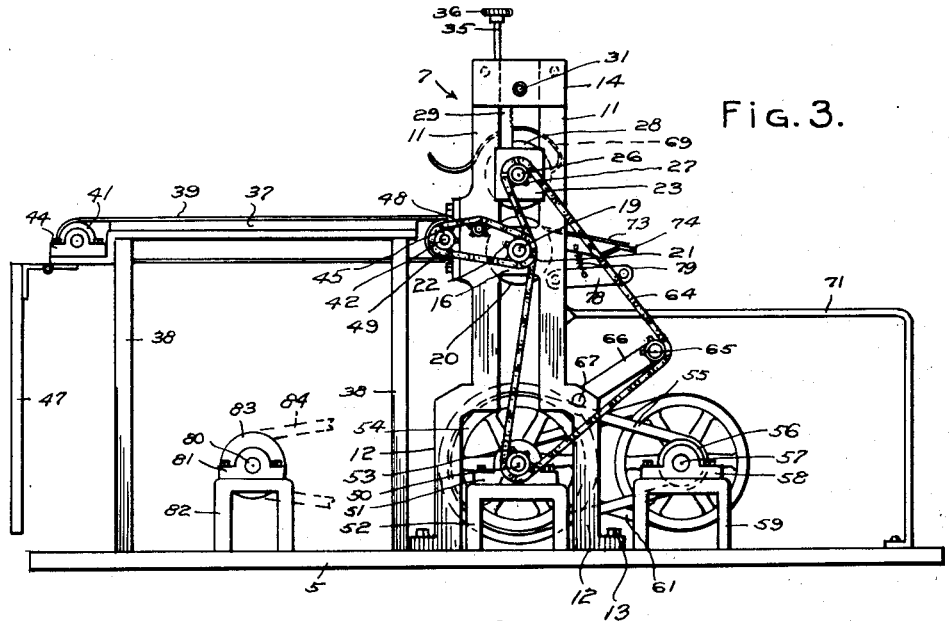

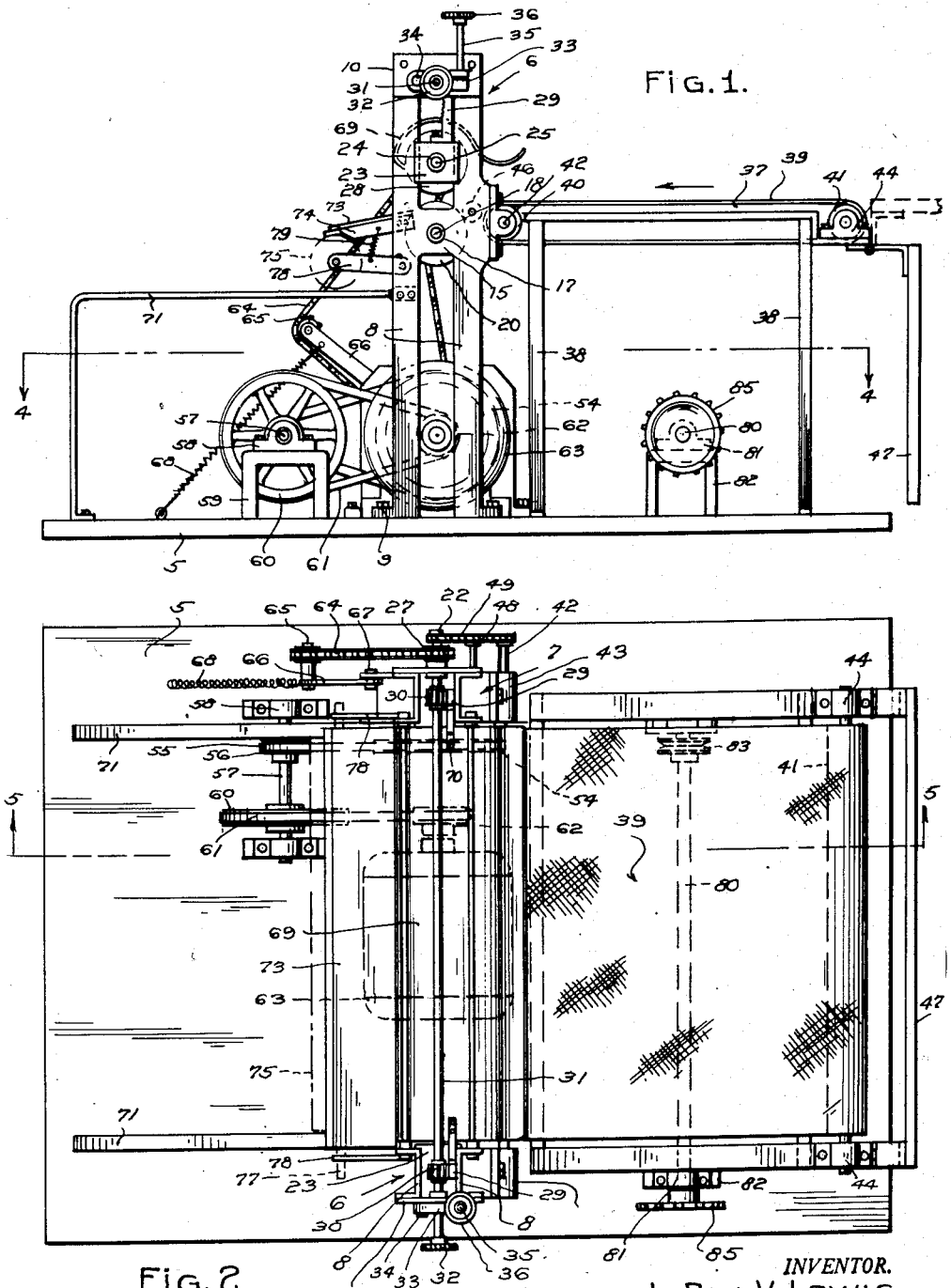

INVENTOR.
LeRoy V. Lewis,
BY
ATTORNEY

Dec. 29, 1953     L. V. LEWIS     2,664,214
DOUGH CONVEYER
Filed Aug. 23, 1950     3 Sheets-Sheet 3
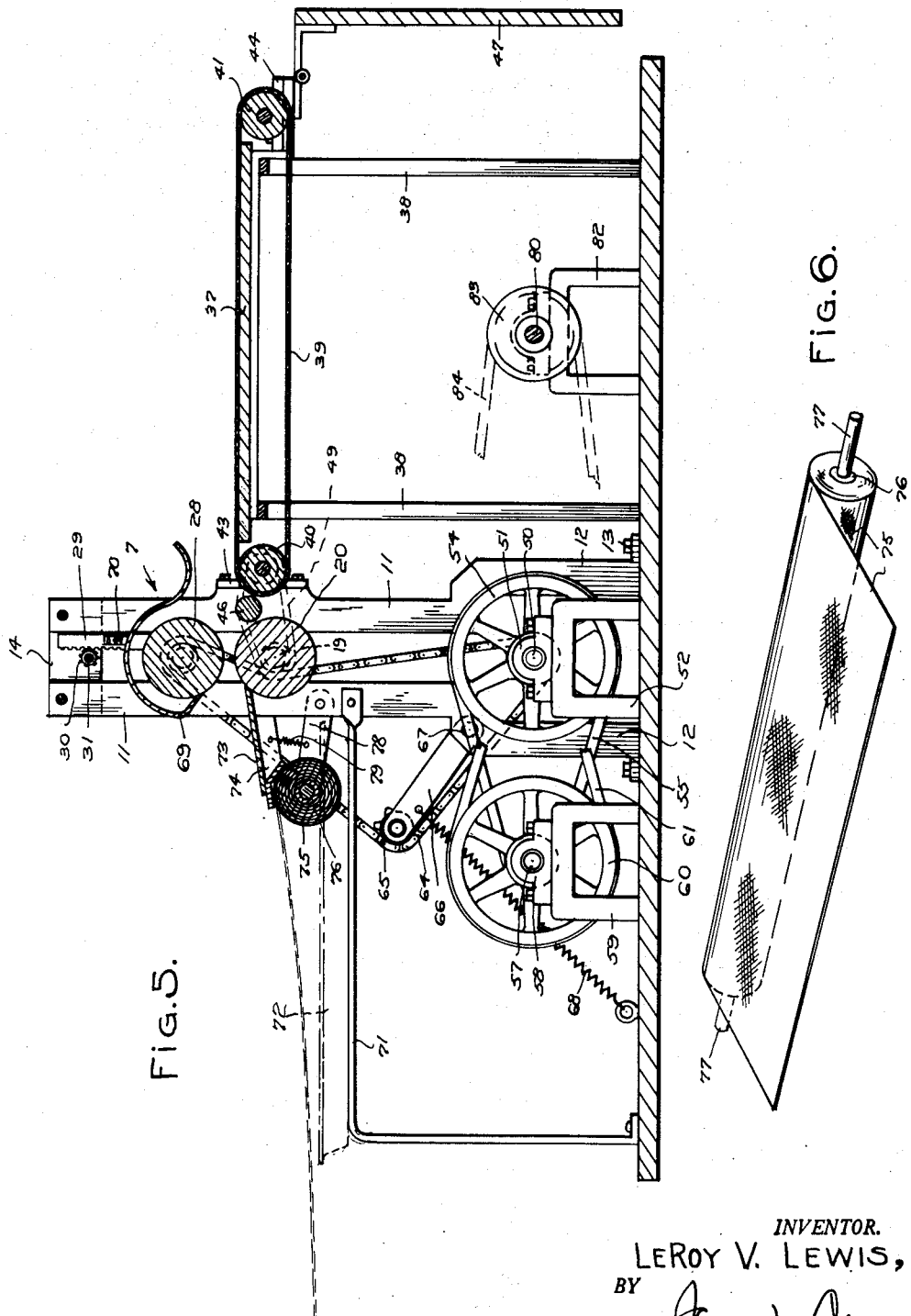
INVENTOR.
LeRoy V. Lewis,
BY
ATTORNEY.

Patented Dec. 29, 1953

2,664,214

UNITED STATES PATENT OFFICE 2,664,214

DOUGH CONVEYER

Leroy V. Lewis, Hollywood, Fla.

Application August 23, 1950, Serial No. 180,946

1 Claim. (Cl. 214—1)

This invention relates to improvements in rolling machines and has particular reference to a machine for rolling dough products in varying quantities and sizes and of uniform thicknesses.

The invention contemplates a machine primarily for use as a kitchen accessory to facilitate the handling of large quanties of dough products, such as cakes, pie shells and a multitude of such products produced in large quantities and includes a machine having an endless feed apron for conducting the dough to a pair of presser rolls, one of which is adjustable to regulate the thickness of the rolled dough passing therebetween to be deposited upon a suitable tray.

The invention further contemplates a machine having the above mentioned characteristics and including a rolled textile belt adapted to be extended progressively from the take-off side of the machine to progressively receive rolled dough products from the rollers with the belt being extended to overlie an adjoining table or other surface, thus enabling the operator to feed a relatively large quantity of dough products of varying sizes and shapes and conduct them from the machine in a manner calculated to produce such large quantities without interrupting the motion of the machine, such as would be the case if the rolled products were deposited in a tray.

Novel features of construction, including scrapers for the presser rolls, one of which serves also as a guard at the entrance side of the rollers, an alternate drive means for the machine, a pair of spring retracted arms for the retarding support of the rolled textile belt and a drop leaf extension table to be shifted to a horizontal position flush with the endless feed apron to facilitate the handling of relatively large quantities of dough.

Other novel features of operation and construction will be readily apparent during the course of the following description, reference being had to the accompanying drawings, wherein has been illustrated the preferred embodiments of the device and wherein like characters of reference denote like parts throughout the several figures.

In the drawings—

Figure 4:
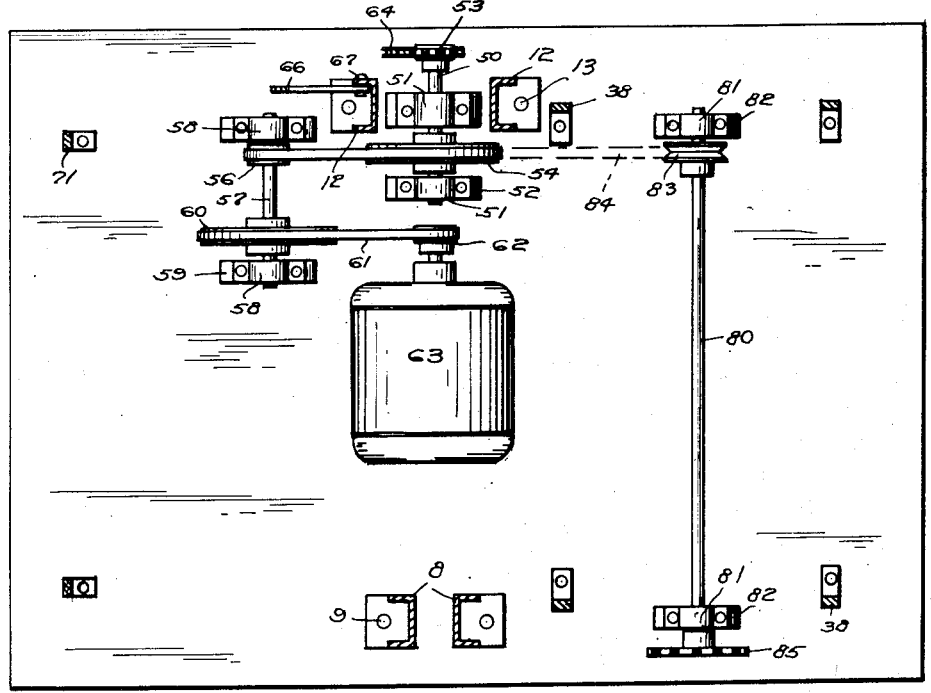

Figure 1 is a side elevation of a machine constructed in accordance with the invention, Figure 2 is a top plan view thereof, Figure 3 is a side elevation of the machine upon the side opposite to Figure 1, illustrating the continuous drive to the several rollers, Figure 4 is a horizontal section of the machine, taken on line 4—4 of Figure 1, Figure 5 is a vertical longitudinal sectional view of the machine, taken on line 5—5 of Figure 2 and, Figure 6 is a perspective view of a rolled extension conveyor belt.

Referring specifically to the drawings, the numeral 5 designates a generally rectangular base, formed of wood, metal or any other desirable material. The base 5 is adapted to be supported upon suitable legs or other elevating means, not shown, of a height generally flush with the top of a receiving table.

Bolted or otherwise rigidly mounted upon the base 5, adjacent its sides, are a pair of perpendicular supporting structures 6 and 7. The structure 6 embodies a pair of spaced parallel and opposed channel irons 8, bolted to the base 5, as at 9. The channel irons 8 are tied together at their upper ends by a plate 10, welded or otherwise attached thereto rigidly. The structure 7 embodies a pair of perpendicular and opposed spaced and parallel channel irons 11, the lower ends of which are offset outwardly at 12, to provide clearance for a bearing device, to be described. The legs 12 are rigidly bolted to the base 5, as at 13. The upper ends of the channels 11 are tied together by a fixed plate 14. Each of the structures 6 and 7 are parallel with each other and in transverse alignment. Each of the structures 6 and 7, at an identical elevation, has welded thereto, fixed journal blocks 15 and 16 having antifriction bearings 17 for rotatably receiving shaft ends 18 and 19, of a presser roller 20, formed of metal or other suitable material. The roller 20 is horizontally arranged and spans the major distance between the structures 6 and 7. The shaft end 19 is extended beyond the structure 7 and has splined thereon, sprockets 21 and 22.

Vertically shiftable upon the channels 8 and 11, are journal blocks 23, provided with antifriction bearings 24, rotatably receiving shaft extensions 25 and 26. The shaft 26 is extended beyond the structure 7 and has splined thereon a sprocket 27. The shafts 25 and 26 support an adjustable presser roller 28, of a size corresponding to the roller 20. The roller 28 overlies and is parallel with the roller 20. The roller 28 is adapted to be shifted in a vertical plane toward and from the roller 20 for accurately determining the thickness of the dough product to be pressed thereby. The means for adjusting the roller 28, includes rack bars 29, upstanding and rigid with the journal blocks 23. The rack bars 29 have meshing engagement with a pair of gears 30, fixed upon a shaft 31, journalled in the plates 10 and 14. One end of the shaft 31 is extended beyond the plate 10 and carries a hand wheel 32, knurled to facilitate operation thereof. Means are provided to clamp the shaft 31 against accidental rotation after the roller 28 has been adjusted, comprising a split block 33, bolted to the plate 10, at 34. The block 33 engages over the shaft 31 and is clamped thereon by a threaded shaft 35, having threaded engagement through the split ends of the block and controllable by a knurled hand wheel 36.

It will be apparent from the structure so far described, that a pair of co-acting presser rollers have been provided that are adjustable to a fine degree to roll dough products to a particular thickness. The roller 28 is maintained in exact parallelism with the roller 20 at all times, due to the rack and gear adjustment that simultaneously elevates and lowers the journal bearings 23. Any suitable gauge may be positioned upon one of the channels 8, adjacent one journal 23 and a pointer may be fixed upon the journal for sliding engagement with the gauge, through the medium of which the operator may determine the exact thickness of the dough required and facilitate future adjustments.

Arranged at the feed end of the machine, is a fixed table top 37, supported upon rigid legs 38, bolted to the base 5. The table has a width substantially co-extensive with the rollers 20 and 28 and of a length calculated to provide an area sufficient to enable the feeding of dough to be rolled under normal circumstances. The table top is slidably engaged by the upper flight of an endless textile feed apron 39, engaging rollers 40 and 41. The roller 40 has shaft extensions 42, journalled in bearings 43, supported upon the channels 8 and 11. The roller 41 is journalled in bearings 44, supported upon the table structure. The shaft 42 is extended at one end and has splined thereon a sprocket 45. An intermediate idler roller 46, is positioned between the rollers 20 and 40 and serves to bridge the gap between the rollers and provide a continuous travel for the dough being fed to the presser rollers. The rollers 20, 40 and 46 are driven in a counterclockwise direction, by means to be presently described, while the roller 28 is simultaneously driven in a clockwise direction. The roller 46 is supported on shaft extensions journalled in the channels 8 and 11 and is parallel with the rollers 20 and 40 and at substantially and identical elevation. An auxiliary drop leaf table 47 is hingedly connected in advance of the roller 41 and is adapted to be swung upwardly to lie substantially flush with the upper flight of the apron 39 and supported in the elevated position by any desirable brace means, not shown. One end of the shaft extensions for the roller 46 is extended and has splined thereon, a sprocket 48. An endless sprocket chain engages the sprockets 22, 45 and 48, shown at 49.

The drive means for the several rollers includes a shaft section 50, journalled in bearings 51, supported at a desired elevation by bearing stands 52. At its outer end, the shaft 50 has splined thereon, a sprocket 53. The shaft 50 is driven in a clockwise direction by a relatively large grooved pulley 54, driven through the medium of an endless belt 55, engaged and driven by a relatively small grooved pulley 56, fixed upon a shaft 57. The shaft 57 is journalled in bearings 58, supported upon bearing stands 59. The shaft 57 is driven in a clockwise direction through the medium of a large pulley 60, driven by an endless belt 61, in turn being driven from a relatively small pulley 62, splined upon the shaft of a prime mover, such as an electric motor 63. The desired speed reduction from the motor 63 is thus accomplished through the stepped down pulley sizes and this speed is predetermined in accordance with the most effective speed of the rollers 20 and 28. An endless drive sprocket chain 64, engages the sprockets 53, 21 and 27 for imparting a continuous and identical speed to the rollers 20 and 28. The chain 64 is also trained over an idler sprocket 65, rotatably supported upon a tension arm 66, pivotally supported at 67, to one channel 11 and normally urged downwardly by a retractile spring 68 for imparting adequate tension upon the chain to maintain it in constant mesh with the several sprockets and to permit of the raising and lowering of the roller 28. Motion imparted to the roller 20, is transmitted to the rollers 46 and 40 and setting the endless apron 39 in motion toward the presser rollers for feeding dough articles thereon to the presser rollers.

In order to prevent dough particles sticking to the roller 28, a scraper 69, of sheet metal, has been provided. The scraper 69 is arcuate in cross-section and of a length to completely overlie and engage the discharge side of the roller 28 for its full length. The scraper 69 is curved rearwardly to provide a safety guard over the roller 46 and the take-off end of the apron 39 and is employed to avoid accidental injury by the operator coming in contact with the rollers 20 and 28 when feeding articles thereto. It is essential that the relative position of the roller 28 and its scraper 69 be maintained at all times and positions of adjustment of the roller 28 and, to accomplish this, the scraper is attached to the journal blocks 23, by rigid brackets 70, hence, the scraper travels with the bearings and the roller 28.

At the discharge end of the machine, elevated parallel bars 71 are provided, one end being fixed to the channels 8 and 11, while the opposite ends are bolted to the base 5. The bars support any desirable form of receptacle, such as a pan 72 for the reception of the dough products being discharged from the presser rollers 20 and 28.

A fixed and preferably inclined apron 73, is rigidly supported from the channels 8 and 11, by angle irons 74. The apron extends for the full length of the roller 20 with its inner edge engaging the roller 20 to serve as a scraper against dough articles adhering thereto. The apron serves to direct the rolled dough articles outwardly for discharge into the pan 72.

It has been found desirable under certain conditions, to provide a means for continuously moving the sheet of rolled dough from the discharge side of the rollers to prevent it from piling upon the pan 72. For this purpose, a roll of textile material 75 is separated upon a roller 76 having a shaft extensions 77. The shaft extensions are rotatably supported in arms 78, pivotally supported upon the channels 8 and 11 and normally urged upward, by retractile springs 79. The roller 76 with the material 75 rolled thereon, is supported upon the arms 78, by merely slipping the shaft extensions 77 through openings formed in the arms. Upon release, the springs swing the arms 78 upward and cause the roll of material to contact the under side of the angle irons 74. Since the material of the roll 75 is to be drawn forwardly by hand, it follows that free movement thereof will be prevented by the frictional contact with the angle irons, as determined by the springs 79. Thus, while the dough is being fed to the rollers 20 and 28 from the apron 39, another operator will slowly feed the material 75 forwardly, as indicated in dotted lines in Figure 5, supporting the sheet of dough thereon as it is being discharged from the rollers and the material thus provides a very novel support that can be extended for a considerable distance beyond the machine. The material 75 is similar to that of the apron 39 and for such use, is usually powdered with flour to prevent the dough sticking. The roll 75, after use, may be removed from the arms 78 and rerolled, after which it may again be placed in position upon the arms for subsequent use and normally underlies the apron 73 and offers no obstacle to the rolled dough passing into the pan 72, when such is used.

An alternate drive means has been provided for the shaft 50, consisting of a drive shaft 80, journalled in bearings 81, supported upon bearing stands 82. The shaft 80 has fixed thereon a grooved pulley 83, positioned in alignment with the pulley 54 and an endless belt 84, shown in dotted lines, serves to drive the shaft 50. At its opposite end, the shaft 80 is provided with a sprocket 85, driven from a sprocket, not shown, carried by a conventional mixing machine, through the medium of a chain, also not shown. In using the alternate drive, the shaft 57 and associate elements, including the motor 63, is dispensed with and the speed of the machine is governed by the multiple speed control normally associated with the mixing machine. Where the mixing machine is available, the cost of the rolling machine of this invention is greatly reduced, since the shaft 57, its bearings and drive pulleys and the motor are all eliminated.

In the use of the device, the operator places the machine in motion by starting the motor 63, which motion is transmitted to the several rollers 20, 28, 46 and 40, causing the endless apron 39 to start its travel in the direction of the arrow. The operator having first determined the particular product to be formed, adjusts the upper roller 28 toward or from the roller 20 and locks the shaft 31 against further movement by the hand wheel 36. If the pan 72 is to be used, it is placed upon the supporting bars 71. Dough of the proper consistency and in the proper size, is placed upon the apron 39 and moves forwardly to be engaged and rolled by the rollers 20 and 28 to be subsequently discharged upon the apron 73 to pass into the pan 72. Where an abnormally large quantity of dough is to be handled and where it is relatively difficult to handle a large quantity upon the apron 39, the operator lifts the table 47, providing an additional work surface, from which the dough can be fed to the apron 39 in the proper quantities. The machine is capable of receiving and rolling any size sheet of dough within the limits of its rollers 20 and 28, with the rolled dough always being uniform as to the thickness for which the roller 28 has been set. A long strip of dough being discharged over the apron 73, will pile in folds in the pan 72 and may be again passed through the rollers for additional rolling when desired, by merely lifting the pan and transferring it to the feed end of the machine where it is again started through the rollers by gradually unfolding and feeding to the apron 39. When it is desired that a relatively long strip of dough is to be rolled and spread in a continuous strip, such for instance, as when the operator desires to cut biscuits or the like, the pan 72 is removed and the operator starts to pull the material 75 forwardly while a second operator is feeding the dough to the apron 39. The material 75 is drawn forwardly at a speed corresponding to the speed at which the rolled dough is being discharged. Obviously, the extended material 75 carrying the rolled dough, overlies a table or other surface and when the rolling has been completed, the operator merely cuts his biscuits or the like directly upon the material 75.

It will be apparent from the foregoing, that a very novel machine has been provided to accurately roll dough to the desired and uniform thickness in a continuous and simplified manner and resulting in a considerable saving in time and labor over the old method of hand rolling and with highly improved product. The structure is relatively simple, embodying few and simple parts requiring little attention and can be manufactured at a relatively low cost as compared with rolling machines heretofore employed.

It is to be understood, that the invention is not limited to the precise arrangement of parts nor to their particular method of operation, but that such changes in the shape, size and material may be made as falls within the spirit of the invention or the scope of the subjoined claim.

Having described my invention, what I claim as new and desire to secure by Letters Patent is:

A conveying device for use with a dough rolling machine that has a discharge end, the combination with a fixed inclined discharge apron that spans the discharge end of the machine to receive rolled dough articles from the machine and a conveying device for receiving and conveying dough articles away from the discharge apron, the conveying device consisting of a roller having a shaft that extends beyond the opposite ends of the roller, a pair of arms for removably and rotatably receiving the extended ends of the shaft, the arms being pivotally supported upon the dough rolling machine at opposite sides of the discharge end, spring means connected with the arms and the dough rolling machine for urging the arms to swing upwardly, a textile belt wound upon the roller with the roller and its supported wound textile belt arranged beneath the discharge apron and with the wound belt frictionally maintained in contact with the underside of the apron by the spring means for the arms, the belt having a width corresponding to the major width of the discharge apron, the belt adapted to be manually unrolled and fed forwardly for conveying progressively rolled dough articles being progressively discharged from the discharge apron, the belt being maintained in frictional contact with the discharge apron continuously as it is unrolled.

LEROY V. LEWIS.

References Cited in the file of this patent

UNITED STATES PATENTS

| Number | Name | Date |
|---|---|---|
| 488,404 | Robertson | Dec. 20, 1892 |
| 698,814 | Chase et al. | Apr. 29, 1902 |
| 881,439 | Peters | Mar. 10, 1908 |
| 1,339,637 | Tybout | May 11, 1920 |
| 2,275,714 | Anetsberger et al. | Mar. 10, 1942 |